Figure 2:
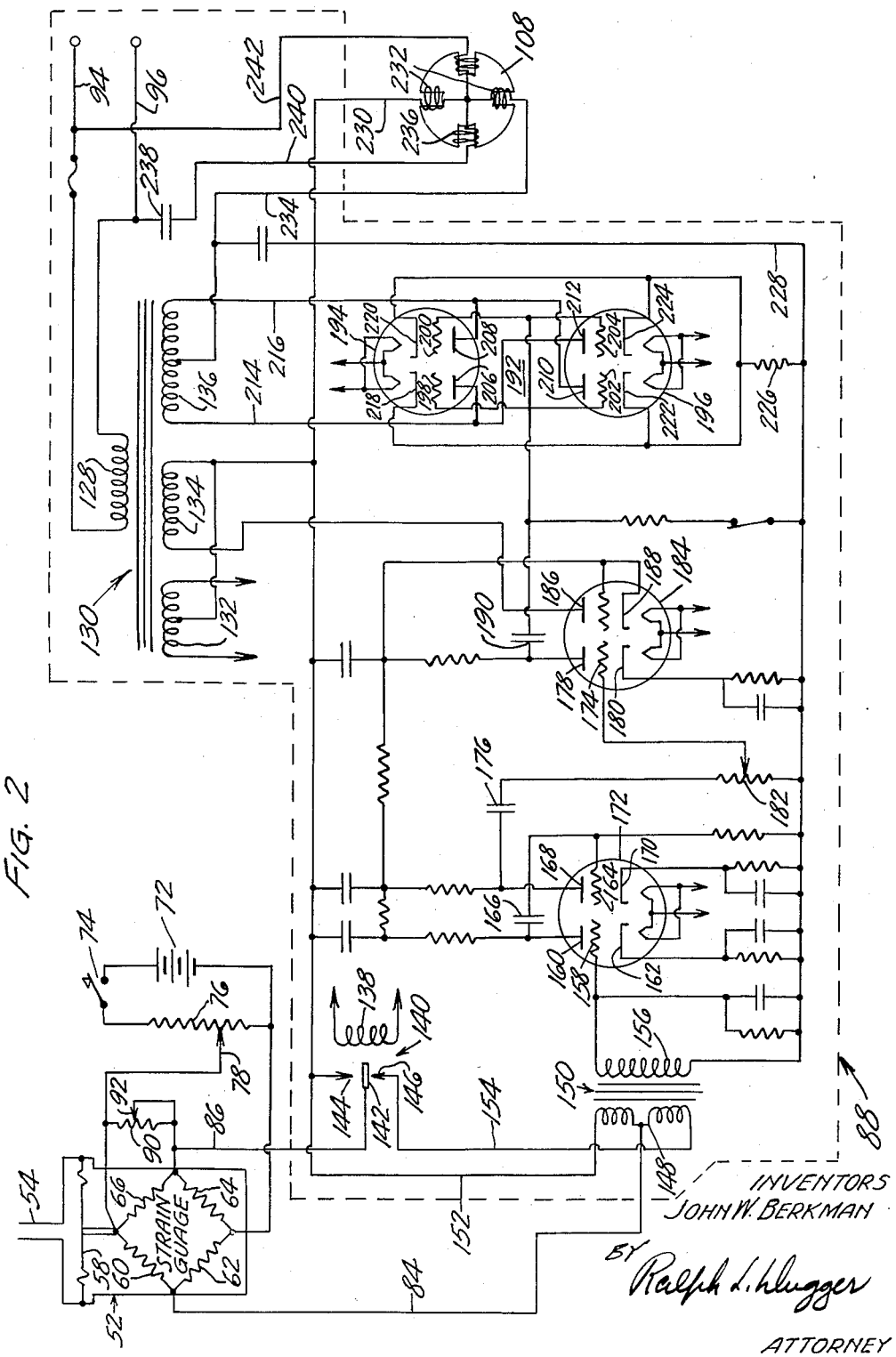

Dec. 9, 1958 J. W. BERKMAN 2,863,287
VACUUM CONTROL SYSTEM
Filed Nov. 9, 1956 2 Sheets-Sheet 1

INVENTORS
JOHN W. BERKMAN
BY
Ralph L. Dugger
ATTORNEY

INVENTORS
JOHN W. BERKMAN
BY Ralph L. Khugger
ATTORNEY

United States Patent Office 2,863,287
Patented Dec. 9, 1958

2,863,287

VACUUM CONTROL SYSTEM

John W. Berkman, Binghamton, N. Y., assignor to Research Corporation, New York, N. Y., a corporation of New York Application November 9, 1956, Serial No. 621,300

3 Claims. (Cl. 60—60)

This invention relates generally to vacuum control systems and pertains more particularly to a system of this character which is entirely automatic in the maintenance of a desired vacuum.

While my system is designed to have rather general application in the regulation of negative pressures it is believed to have especial utility in the conducting of laboratory and hospital operations where a relatively accurate vacuum control is either highly desirable or mandatory. With respect to employment in hospitals and like institutions it may be pointed out at this time that the system of vacuum control described herein has proved exceptionally satisfactory as an accessory in the performance of corrective thoracic surgery. In this regard, should more details be desired, attention is drawn to an application for Letters Patent filed March 19, 1956 by John W. Berkman, Richard E. Jones and Paul D. Senstad, Serial No. 572,389, for "Pump Oxygenator," said application having been assigned to the same assignee as the instant application.

One important object of the invention is to provide a vacuum control system that will be quite accurate in its regulation, even though the source of negative pressure should vary over wide limits. In this connection, it is contemplated that the vacuum source may make use of ordinary laboratory type Venturi vacuum apparatus connected directly to a water tap, the outlet pressure of which cannot be depended upon to remain constant.

Another object of the invention is to provide a system that does not require large and cumbersome pieces of equipment in its construction, thereby rendering the apparatus comprising the system compact and portable in nature.

A further object of the invention is to provide a system that is rugged and long-lasting, being capable of withstanding comparatively rough handling. Although it is contemplated that the system will be capable of prolonged successful use, nonetheless it is an aim of the invention to provide for a rapid changeover from automatic operation to a manual one should circumstances so dictate.

A still further object is to provide a system of the above-mentioned type that can be manufactured and sold at a relatively low cost, thereby encouraging its widespread adoption.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 1 is a view illustrating the complete system exemplifying the invention, and Figure 2 is a schematic electrical diagram showing in greater detail the electrical features set forth in Figure 1.

Referring in detail now to Figure 1, the system there depicted includes a vacuum operated device 10 requiring a regulated negative pressure. As shown the device 10 is equipped with a vacuum gauge 12 for indicating the magnitude of the vacuum or negative pressure prevailing within the device, there being a pet cock 14 interposed between the gauge and said device for permitting removal of said gauge when necessary without loss of vacuum.

Leading from the device 10 is a vacuum regulated tube or line 16 via which air may be removed, the line extending to a vacuum control valve designated generally by the reference numeral 18. As can be discerned from Figure 1, the valve 18 includes a hollow cubical casing 20 forming a chamber 22 and having a planar top 24. The flat top 24 is provided with an air bleeder opening 26 permitting entrance of air into the chamber 22. Coacting with the opening 26, which is of a tapered arcuate configuration, is a rotatable closure disk 28 having a segment thereof removed at 30, thereby forming divergent edges 32, 34. The angle embraced by the removed segment 30 is commensurate with the subtended angle of the opening 30 so that said opening may be completely uncovered when the disk has been rotated into a proper angular relationship therewith. An upstanding post or lug 36 acts as a limit stop for the disk 28, being obstructively engageable with the edge 32 when the disk has been rotated counter-clockwise to a fully open position and similarly engageable by the other edge 34 when said disk has been rotated in a clockwise or reverse direction to close completely the opening 26.

Leading from the control valve 18 is a second tube 38 constituting an unregulated vacuum supply line. The source of vacuum supply may assume a variety of constructions. Here, however, the vacuum producing means, indicated generally by the numeral 40 is simply formed of a Venturi tube 42 projecting into said line 38. The Venturi tube is equipped with a shut-off valve 44 which for the purpose of explanation we will assume to be the faucet of an ordinary water tap. Although such a tap is readily accessible, it will be appreciated that the water pressure is subject to rather wide fluctuations and therefore cannot be depended upon to produce a constant negative pressure. However, it is the function of the control valve 18 to maintain a predetermined vacuum in the vacuum device 10, as will become more apparent as the description progresses. The water of course flows through the tube in the direction of arrow 48. The discharged water and air is represented by arrow 50.

To regulate the vacuum or negative pressure within the vacuum device 10 there is provided a pressure responsive device 52, there being a take-off line 54 leading directly to a casing or housing 56 forming a part of said pressure responsive device. The device 52 comprises a pressure sensitive diaphragm 58 having its lower side in communication with the line 54 and hence in communication with the device 10. Further included in the pressure responsive device 52 is a Wheatstone bridge having in the illustrated instance a strain sensitive electrical impedance 60, 62, 64, 66 in each leg thereof, although one such impedance element could suffice, the other impedance elements of the bridge then having fixed impedance values. Strain gauge elements, as such, have become well known and accordingly they need not be described in detail other than to say that they are herein subject to elongation owing to flexure of the diaphragm 58, thereby having their electrical resistance varied according to such diaphragm movement. While in practice the elements 60, 62, 64, 66 (or single element if only one such element is employed) would be cemented directly to the diaphragm 58, the bridge made up of these strain sensitive elements has herein been pictured as being constrained between a fixed point 68 established by the casing 56 and in upstanding post 70 carried on the diaphragm 58.

Energization for the Wheatstone bridge is in the form of a D.-C. voltage furnished by a battery 72 or other constant voltage supply. In circuit with the battery is a switch 74, the switch 74 serving to connect the battery to a potentiometer 76 having an adjustable tap 78. By means of conductors 80, 82 the adjusted potential derived from a proper setting of the potentiometer tap 78 is delivered to the junctions between the elements 60, 68 and the elements 62, 64, respectively. Additional conductors 84, 86 lead to an amplifier 88 shown only in block outline in Figure 1 but which is diagrammed in greater detail in Figure 2. A second potentiometer 90 having an adjustable tap 92 is connected in parallel with the element 66, being joined to the conductor 80 and the conductor 86. This potentiometer 90 permits the impedance of the leg containing the element 66 to be altered so that the error signal fed to the amplifier 88 may be adjusted for a particular negative pressure to be maintained at the device 10.

A pair of power lines 94, 96 connect the amplifier 88 to a 60-cycle source of A.-C. power designated by the numeral 98, there being a disconnect switch 99 in line 94. A pair of reference conductors 100, 102 and a pair of control conductors 104, 106 lead from the amplifier 88 to a two-phase servo-motor 108. However, the particular way in which the energization and operation of the motor 108 is realized is best reserved for discussion when describing Figure 2.

The motor 108 is provided with a drive shaft 110 mechanically coupled to a friction clutch 112, the clutch in turn being coupled to a driven shaft 114. Carried at the lower end of the shaft 114 is a pinion gear 116 meshing with a driven gear 118. The gear 118 is keyed to the upper end of a shaft 120 and the lower end of this shaft is connected directly to the rotatable disk 28. Thus the disk 28 may be rotated into a preferred degree of coverage with respect to the opening 26 by the reversible servomotor 108. Should there be a power failure an auxiliary gear 122 is provided which is in engagement with the driven gear 118, this gear 122 having a shaft 124 and a crank handle 126 by which the disk 28 may be manually rotated if the need arises.

Passing now to Figure 2 it will be observed that the conductors 94, 96 supply the primary winding 128 of a power transformer 130 having several secondary windings 132, 134, 136. Connected to the secondary winding 132 is an energizing winding 138 of a chopper 140, the function of which is to convert D.-C. to A.-C. To this end, as is conventional, the chopper 140 is equipped with a vibratable armature contact 142, said armature contact being movable between a pair of spaced, stationary contacts 144, 146 by magnetic action derived from the winding 138. These fixed contacts 144, 146 are in circuit with a centertapped primary winding 148 of an input transformer 150 by way of conductors 152, 154. The conductor 84 from the Wheatstone bridge forms the center tap for the primary winding 148 whereas the conductor 86 is connected to the armature contact 142.

The transformer 150 has a secondary winding 156, one side of which is connected to a grid 158 of a first amplifying stage including a plate 160 and cathode 162. The first stage is capacitively coupled to a grid 164 of a second amplifying stage through the medium of a condenser 166, the second stage including a plate 168 and cathode 170. The first and second amplifying stages are formed in the illustrated instance by a twin triode such as a 12AX7 vacuum tube denoted by the numeral 172. The second amplifying stage is in turn capacitively coupled to a grid 174 of a third amplifying stage via a condenser 176 which stage includes a plate 178 and a cathode 180. A gain control potentiometer 182 is in circuit with the grid 174 and condenser 176. The third amplifying stage may constitute one half of a second 12AS7 vacuum tube 184. The other half of this twin triode tube 184 serves a rectifier, its plate 186 and cathode 188 being connected to the secondary winding 134 over an easily traced path. Thus the rectifier consisting of the plate 186 and cathode 188 supplies plate voltage to the plates 160, 168 and 178 of the first, second and third amplifying stages.

By means of a condenser 190 the third voltage amplifying stage is connected to a power amplifying stage designated in its entirety by the numeral 192. As shown, this power stage consists of a pair of twin triode tubes 194 and 196 such as 12AU7 tubes. These tubes are equipped with grids 198, 200, 202, 204, all of which are commoned and connected to said coupling condenser 190. The tube 194 includes plates 206 and 208, whereas the tube 196 includes plates 210 and 212. The plates 206 and 212 are connected to one side of the secondary winding 136 by a conductor 214, and the plates 208 and 210 are connected to the other side of said winding 136 by a conductor 216. The tube 194 also contains cathodes 218 and 220, whereas the tube 196 contains cathodes 222 and 224. These cathodes are all joined together and by reason of a resistor 226, a conductor 228 and a conductor 230 they are connected to one side of a control winding 232 belonging to the two-phase servomotor 108. Through the agency of a conductor 234 the other side of the control winding 232 is connected to a center tap on the secondary winding 136. As already stated the servomotor 108 is a two-phase motor so it is also equipped with a quadrature or reference winding 236, a condenser 238 establishing the 90° relationship. By virtue of the conductors 240, 242 the reference winding 236 and the condenser 238 are serially connected to the power conductors 94, 96, and hence receive energization from the single power source 98.

In order not to encumber the drawing unduly the conductors leading from the secondary winding 132 to the energizing winding 138 of the chopper have not been shown. It is also contemplated that the same winding 132 act as a supply for the filaments of the tubes 172, 184, 194 and 196. Here again the connecting conductors have been omitted for the sake of drawing simplicity.

From the foregoing it is believed that the operation of my vacuum control system will be readily apparent. However, a brief outline of a typical operation may prove of assistance in comprehending the full utility of the disclosed system.

Therefore, to inaugurate an operation the valve 44 is opened so as to produce an unregulated vacuum in the line 38. Depending upon the delicateness of the vacuum operated device 10 the closure plate 28 may be manually adjusted through the agency of the crank handle 126 so as to avoid applying too severe a negative pressure at the device 10.

Next, the servomotor 108 may be placed in automatic operation by closing the switches 74 and 99 (the latter appearing only in Figure 1). If necessary, the voltage applied to the Wheatstone bridge 60—66 may be adjusted through the medium of the potentiometer 76. More important, though, is the adjustment of the potentiometer 90 by which a predetermined vacuum is to be obtained and maintained, for this will establish the balanced condition of the Wheatstone bridge. When balanced there will of course be no error signal. Also, if the output from the amplifier 88 is not of the proper magnitude to result in an effective operation, that is the proper amount of torque, of the servomotor 108 for a particular deviation form desired vacuum conditions, the gain control potentiometer 182 may be adjusted.

Once the required vacuum conditions have been realized any significant deviation therefrom will result in a corrective rotation of the closure plate 28. In this regard, if the vacuum source 40, which is unregulated, should produce a different vacuum from what the control valve 18 has up to that moment adjusted itself for, then the diaphragm will be flexed to a different extent. This will modify the output signal from the Wheatstone bridge 60—66 because the length of the elements 60, 62, 64 and 66 will be correspondingly changed. Thus an error signal is produced that initiates a corrective action.

The corrective action is best understood at this point by referring to Figure 2. If we assume that the junction formed by the strain gauge elements 60, 62 has been rendered positive with respect to the junction formed by the elements 64, 66, there will be current flow through the conductor 84 to the center-tapped primary winding 148, through one-half of the winding over conductor 152 where the armature contact 142 is engaged with fixed contact 144 and then via the conductor 86 back to the junction formed by the elements 64, 66. This is for only one-half cycle. On the next half cycle the armature contact 142 will of course be in engagement with the other fixed contact 146 and the path will be via conductor 84, through the lower half of the winding 148, through conductor 154, the contact 146, the contact 142 and back to the bridge over the conductor 86.

By reason of the grid 158 being connected to the secondary winding 156 of the input transformer 150, it follows that this grid will have applied thereto an alternating potential. On the positive swings there will be current flowing in the plate circuit of the first amplifying stage. Owing to the coupling condenser 166 there will in turn be signal impressed on the grid 164 of the second amplifying stage. Similarly, existence of plate current in this second stage will impress a grid signal on the grid 174 of the third stage. The condenser 190 will of course influence the conduction of the power stage 192. While the output from the third stage is impressed upon all of the grids 198, 200, 202 and 204 simultaneously only two plates will be positive at any given instant. This is so by virtue of the plates 206, 212 being connected to the left side of the secondary winding 136, and the plates 208, 210 being connected to the right side. Thus if the left half of tube 194 becomes conductive, together with the right half of tube 196, then the current through the control winding 232 of the servomotor 108 will be in a direction such that the flow is from the control winding 232 over the conductor 234 toward the center tap of the secondary 136. In other words we have assumed the left side of the secondary winding 136 to be positive during a given half cycle. It will be helpful to remember that all phase relationships are with respect to the same power source 98. Accordingly, at this moment we may say, purely in an illustrative sense, that the energization of the winding 232 "leads" the energization of the reference winding 236 of the servo-motor 108. Hence the motor 108 will operate in one rotatable direction at a speed governed by the torque produced by the degree of energization of winding 232. In this respect, if the junction formed by the elements 60, 62 is considerably positive there will be a strong error signal which will be amplified in the amplifier 88 to produce a high output from the power stage 192 and hence a strong energization of the control winding 232. On the other hand a weak error signal will result in a weak output.

At any rate, if we assume that the value of the vacuum has fallen off from that required by the vacuum operated device 10, then the motor 108 will rotate in a direction to cause the closure disk 28 to cover more of the opening 26, thereby bleeding less air into the control valve 18. With less air entering the chamber 22 it becomes evident that the magnitude of the negative pressure at 10 will increase, i. e. the vacuum will become greater or more pronounced.

The change in vacuum conditions will be immediately reflected in the flexing of the diaphragm 58 with the concomitant result that the strain gauge elements will return to a "normal" or "null" impedance value. Such an occurrence will equalize the potential at the junctions formed by the elements 60, 62 and 64, 66. With no error signal current flowing in either direction over the conductors 84, 86 there will be no input to the transformer 150 and hence no output from the power stage 192. The motor 108 will then be nulled or stationary.

Should the vacuum at 10 be too great, then under the conditions we have assumed the junction formed by the elements 64, 66 will be more positive than the junction formed by the elements 60, 62. It can then be readily seen that the flow of current through the two halves of the winding 148 will be reversed from our first condition. The end result is that any output signal from the power stage 192 will have a reversed phase relationship. In other words, it will lag the reference phase produced by the condenser 238. Consequently, the flow of current through the control winding 232 of the servomotor 108 will now be from the center tap on the secondary winding 136 via the conductor 234 toward the control winding 232, and the motor 108 will rotate in an opposite direction to open to a larger extent the bleeder opening 26 of the control valve 18. Therefore, we may say that the pulses fed to the control winding 232 "lag" the alternating current coursing through the reference winding 236.

Consequently, it is believed readily apparent that a vacuum control system has been devised that will meet a variety of needs and that it will act in a highly effective manner. As already mentioned, should for any reason a power failure occur, either within the system itself or by virtue of a fault between the system and said source 98, then resort can be quickly made to the manual adjustment for the control valve 18 provided by the crank handle and the interengagement of its attached gear 122 with the gear 118.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A vacuum control system comprising vacuum producing means, a device requiring a regulated vacuum for its proper functioning, valve means including a chamber connected to said vacuum producing means and said device, said valve means having an opening leading to atmosphere and a shiftable closure member with respect to said opening to thereby vary the area of said opening, a servo-motor connected to said shiftable closure member, said servo-motor having a control winding and a reference winding, a pressure sensitive diaphragm having one side thereof subjected to vacuum conditions prevailing in said device, strain gauge means situated at the other side of said diaphragm and actuatable by flexure of said diaphragm to generate an error signal when said vacuum conditions deviate from a predetermined value, means for amplifying said error signal to produce a control signal, and circuit means for applying said control signal to said control winding and circuit means for energizing said reference winding, whereby said servo-motor is operated to position said closure member so as to permit entrance of air into said chamber to the extent necessary to maintain said predetermined value of vacuum.

2. The combination of claim 1 further characterized in that said valve means includes a casing having a flat surface with said opening being located in said flat surface and that said closure member constitutes a rotatable disk having a segment thereof removed so as to uncover portions of said opening.

3. The combination of claim 2 further characterized in that said opening is arcuately tapered.

References Cited in the file of this patent

UNITED STATES PATENTS

| | | |
|---|---|---|
| 777,372 | Howard | Dec. 13, 1904 |
| 974,286 | Matchette et al. | Nov. 1, 1910 |
| 2,391,877 | Cahan | Jan. 1, 1946 |
| 2,402,499 | Lawrence | June 18, 1946 |
| 2,457,874 | Davis | Jan. 4, 1949 |
| 2,505,292 | Mallory | Apr. 25, 1950 |